US005783242A

United States Patent [19]

Teague

[11] Patent Number: 5,783,242
[45] Date of Patent: Jul. 21, 1998

[54] METHOD FOR TREATING FOODSTUFFS

[75] Inventor: Fred B. Teague, Columbus, Ind.

[73] Assignee: MBA Consultant, Inc., Winchester, Ind.

[21] Appl. No.: 379,730

[22] Filed: Jan. 27, 1995

[51] Int. Cl.⁶ .................................................. A23B 4/16
[52] U.S. Cl. .......................... 426/320; 426/237; 426/246; 426/248; 426/312; 426/315; 426/332; 422/22; 422/24
[58] Field of Search ............................. 426/320, 312, 426/315, 332, 644, 474, 237, 248, 246; 422/28, 32, 24, 22

[56] References Cited

U.S. PATENT DOCUMENTS

| | | | |
|---|---|---|---|
| 2,339,507 | 1/1944 | Nagy et al. | 426/312 |
| 3,689,958 | 9/1972 | Dillon | 99/517 |
| 3,729,773 | 5/1973 | Dillon | 426/524 |
| 4,182,663 | 1/1980 | Vaseen | 204/157.1 R |
| 4,185,359 | 1/1980 | Niccols | 452/106 |
| 4,396,582 | 8/1983 | Kodera | 422/300 |
| 4,468,839 | 9/1984 | Chittenden | 452/173 |
| 4,683,618 | 8/1987 | O'Brien | 452/173 |
| 4,849,237 | 7/1989 | Hurst | 426/332 |
| 4,933,411 | 6/1990 | Gifford | 426/399 |
| 5,011,699 | 4/1991 | Mitsuda et al. | 426/320 |
| 5,135,721 | 8/1992 | Richard | 426/111 |
| 5,208,057 | 5/1993 | Greenley et al. | 426/332 |
| 5,227,184 | 7/1993 | Hurst | 426/312 |
| 5,352,467 | 10/1994 | Mitchell et al. | 426/320 |

*Primary Examiner*—Lien Tran
*Attorney, Agent, or Firm*—Barnes & Thornburg

[57] ABSTRACT

A method of treating poultry carcasses to reduce the population of contaminating organisms in preparation for consumption includes treating the poultry carcasses with a disinfectant. Suitable disinfectants include ozone and ozone disssolved in water.

18 Claims, 5 Drawing Sheets

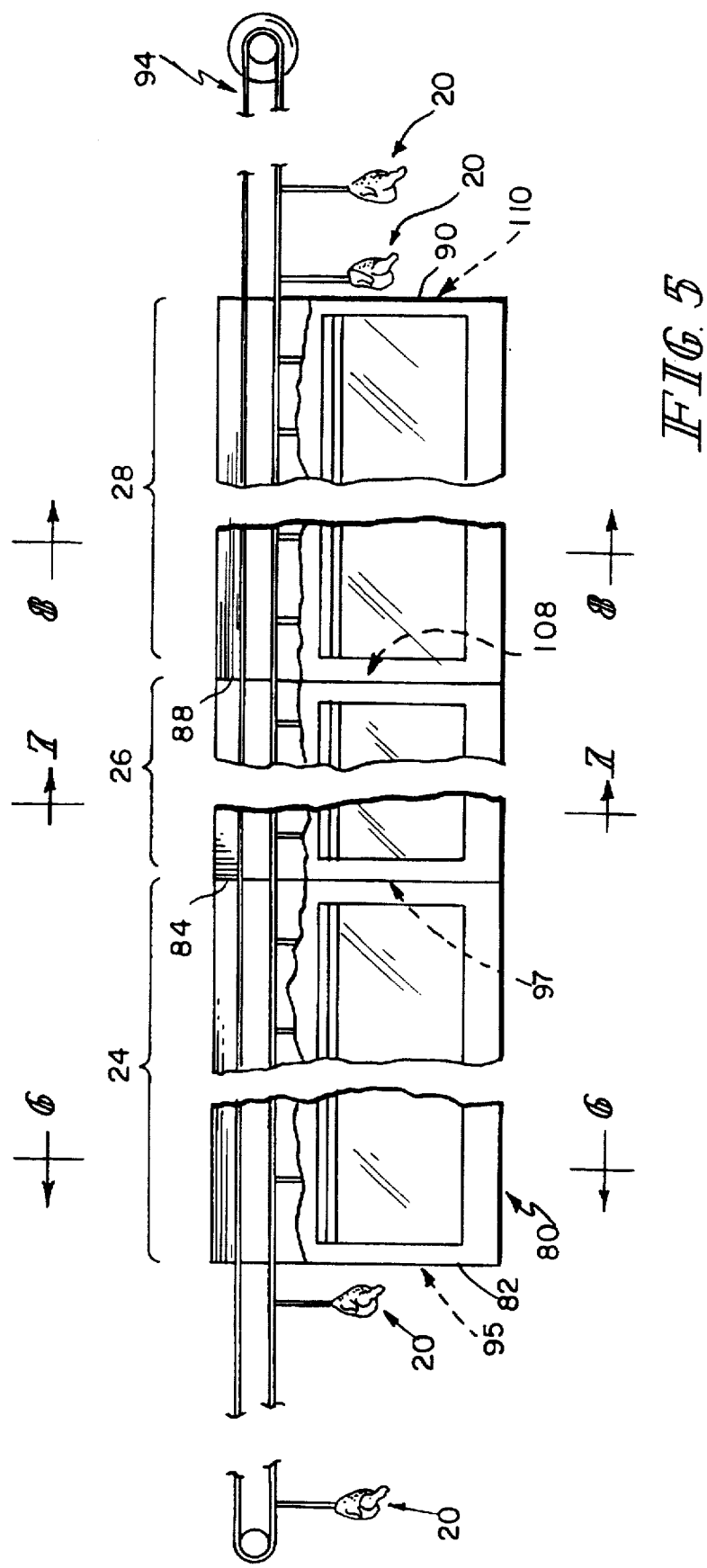

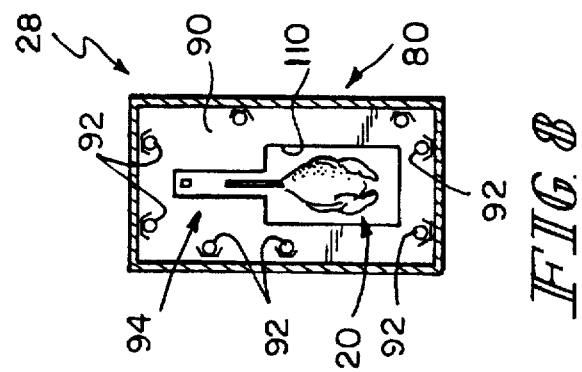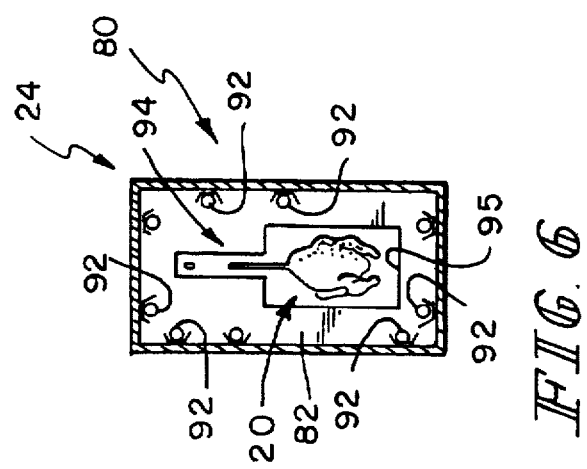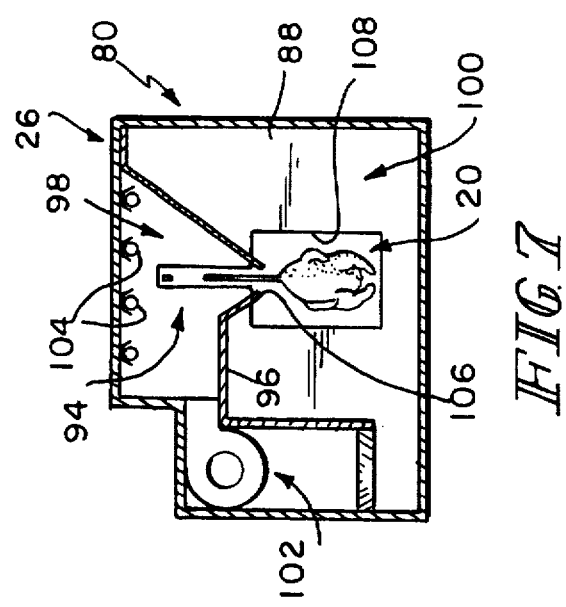

METHOD FOR TREATING FOODSTUFFS

This invention relates to food processing. It is described in the context of preparation of poultry carcasses for packaging for sale for human consumption. However, the invention is believed to be useful in other applications as well.

The poultry industry has long been aware of questions of bacterial contamination of poultry carcasses by conventional methods of poultry processing. The process known in the industry as water chilling, wherein warm poultry carcasses are introduced into an ice water bath for chilling to basically refrigerator temperature, is such a process. Thousands of carcasses are introduced into the bath between changings of the bath, and as a result the bath becomes a bacteria laden soup. Air chilling is a process that avoids this problem, but air chilling is not conventionally performed by the U.S. poultry industry. In air chilling, poultry carcasses are first lightly water spray rinsed and then exposed to extremely cold air to chill them to substantially refrigerator temperature. Cross contamination of the carcasses is, of course, substantially avoided because the ice water bath is avoided. Additionally, the light water spray before air chilling further reduces the bacteria population on the carcasses. Air chilling is conventionally performed today in poultry processing in, for example, Europe, Jamaica and Guyana.

It is an object of the present invention to reduce further the bacterial contamination of poultry carcasses in poultry processing.

According to the invention a method of treating a foodstuff contaminated with organisms to reduce the population of organisms in preparation for consumption comprises treating the foodstuff with a disinfectant.

According to one aspect of the invention, treating the foodstuff with a disinfectant comprises treating the foodstuff with a disinfectant gas in water.

According to an illustrative embodiment, treating the foodstuff with a disinfectant comprises treating the foodstuff with a disinfectant which decomposes into non-hazardous by-products substantially immediately upon treatment of the foodstuff by the disinfectant.

Further according to an illustrative embodiment, treating the foodstuff with a disinfectant comprises treating the foodstuff with ozone.

According to another aspect of the invention, the step of treating the foodstuff with a disinfectant comprises the step of treating the foodstuff with a disinfectant gas.

According to an illustrative embodiment, treating the foodstuff with a disinfectant gas comprises treating the foodstuff with a disinfectant gas capable of being treated to cause it to decompose into non-hazardous by-products substantially immediately upon treatment of the disinfectant gas, and, substantially immediately after treatment of the foodstuff with the disinfectant gas, treating the disinfectant gas to convert it into non-hazardous by-products.

Additionally according to an illustrative embodiment, treating the foodstuff with a disinfectant gas comprises treating the foodstuff with ozone.

Further according to an illustrative embodiment, before treating the foodstuff with ozone, the ozone is generated substantially in situ at the site where the foodstuff is to be treated with the ozone.

According to an illustrative embodiment, generating ozone substantially in situ comprises exposing oxygen to electromagnetic radiation having a wavelength and energy density capable of generating sufficient ozone from the oxygen to effect disinfection.

Further according to an illustrative embodiment exposing oxygen to electromagnetic radiation having a wavelength and energy density capable of generating sufficient ozone from the oxygen to effect disinfection comprises exposing air to ultraviolet radiation (uv) having a wavelength and energy density capable of generating sufficient ozone from the oxygen to effect disinfection.

Additionally according to an illustrative embodiment, exposing ambient air to uv having a wavelength and power density capable of generating sufficient ozone from the oxygen to effect disinfection comprises exposing ambient air to uv having a wavelength in a range including about 185 nanometers (nm).

Further according to an illustrative embodiment, treating the disinfectant gas to cause it to decompose into non-hazardous by-products comprises, after treatment of the foodstuff by the ozone, exposing the ozone to electromagnetic radiation having a wavelength and energy density capable of converting the ozone back into diatomic oxygen.

Additionally according to an illustrative embodiment, before treating the foodstuff with ozone, the ozone is generated substantially in situ at the site where the foodstuff is to be treated with the ozone.

According to an illustrative embodiment, generating the ozone substantially in situ comprises exposing oxygen to electromagnetic radiation having a wavelength and an energy density capable of generating sufficient ozone from the oxygen to effect disinfection.

According to an illustrative embodiment, exposing oxygen to electromagnetic radiation having a wavelength and energy density capable of generating sufficient ozone from the oxygen to effect disinfection comprises exposing air to uv radiation having a wavelength and energy density capable of generating sufficient ozone from the oxygen to effect disinfection.

Further according to an illustrative embodiment, exposing air to uv radiation having a wavelength and energy density capable of generating sufficient ozone from the oxygen to effect disinfection comprises exposing ambient air to uv having a wavelength in a range including about 185 nm.

Additionally according to an illustrative embodiment, the ozone is exposed to electromagnetic radiation having wavelength and energy density capable of converting the ozone back into diatomic oxygen after treatment of the foodstuff by the ozone.

Further according to an illustrative embodiment, exposing the ozone to electromagnetic radiation having a wavelength and energy density capable of converting the ozone back into diatomic oxygen after treatment of the foodstuff by the ozone comprises exposing the ozone to uv radiation having wavelengths in a range including 253.7 nm.

According to an illustrative embodiment, exposing the ozone to electromagnetic radiation having a wavelength and energy density capable of converting the ozone back into diatomic oxygen after treatment of the foodstuff by the ozone comprises exposing the foodstuff to electromagnetic radiation having wavelength and energy density capable of converting the ozone back into diatomic oxygen.

According to an illustrative embodiment, treating the disinfectant gas to convert it into non-hazardous by-products comprises substantially simultaneously treating the disinfectant gas and the foodstuff to convert the disinfectant gas into non-hazardous by-products.

According to illustrative embodiments, treating a foodstuff with a disinfectant comprises treating a poultry carcass with a disinfectant.

BRIEF DESCRIPTION OF THE DRAWING

The invention may best be understood by referring to the following detailed description and accompanying drawings which illustrate the invention. In the drawings:

FIG. 5 illustrates a partly longitudinal sectional side elevational view of a detail of an apparatus useful for conducting portions of the process illustrated in block diagram form in FIG. 1;

FIG. 6 illustrates a sectional view taken generally along section lines 6—6 of FIG. 5;

FIG. 7 illustrates a sectional view taken generally along section lines 7—7 of FIG. 5; and, FIG. 8 illustrates a sectional view taken generally along section lines 8—8 of FIG. 5.

Figure 1:
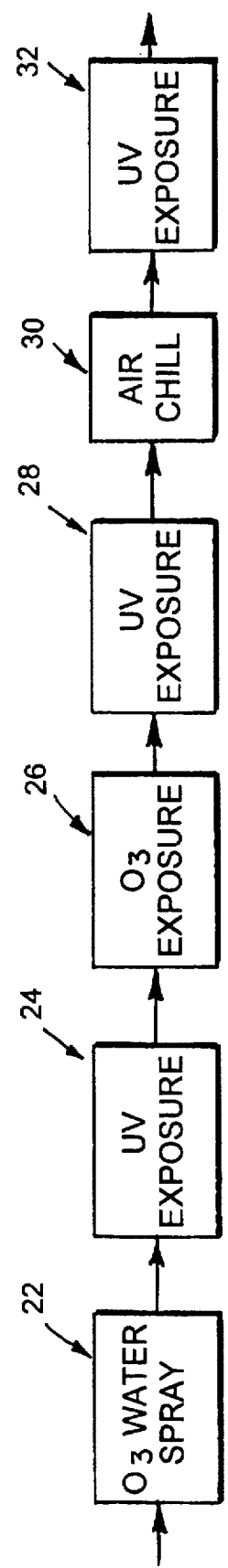
FIG. 1 illustrates a block diagram of a portion of a poultry carcass process incorporating methods and apparatus according to the present invention.

Turning now to the drawings, and particularly to FIG. 1, a process and apparatus for the preparation of poultry carcasses 20 includes a region 22 through which carcasses 20 are conveyed and sprayed with ozonated water to wash bacteria-containing matter from them. The effluent from this spray region 22 can be treated by any of a number of known techniques. However it is noted that the ozonated water itself constitutes a powerful bactericide. Consequently, treatment of the effluent may not be particularly troublesome from an environmental or economic standpoint, and in any event does not form a part of the invention.

The carcasses 20 are next conveyed through a region 24 wherein they are exposed to ultraviolet radiation (uv) in a wavelength range and for a time known to be effective for bactericidal purposes. The following table lists, at an illustrative uv wavelength 253.7 nanometers (nm), ultraviolet energies in microwatt-seconds per square centimeter ($\mu$W-sec/cm$^2$) known to destroy the various organisms listed with those energies.

TABLE

Ultraviolet Energy Levels at 253.7 Nanometers
Wavelength Required for Destruction of
Various Organisms
UV Energy in Microwatt-Seconds per Square Centimeter

| BACTERIAL ORGANISMS | |
|---|---|
| Bacillus anthracis | 8700 |
| B. megatherium sp (vegetable) | 2500 |
| B. megatherium sp. (spores) | 5200 |
| B. paratyphosus | 6100 |
| B. subtilis | 11000 |
| B. subtilis spores | 22000 |
| Clostridium tetani | 22000 |
| Corynebacterium diptheriae | 6500 |
| Eberthelia typosa | 4100 |
| Escherichilia coli | 6600 |
| Leptospira (infectious Jaundice) | 6000 |
| Micrococcus candidus | 12300 |
| Micrococcus sphaeroides | 15400 |
| Microbacterium tuberculosis | 10000 |
| Neisseria catarrhalis | 8500 |
| Phytomonas tumefaciens | 8500 |
| Proteus vulgaris | 6600 |
| Pseudomonas aerugionsa | 10500 |
| Psudomonas fluorescens | 6600 |

TABLE-continued

Ultraviolet Energy Levels at 253.7 Nanometers
Wavelength Required for Destruction of
Various Organisms
UV Energy in Microwatt-Seconds per Square Centimeter

| | |
|---|---|
| S. enteritidis | 7600 |
| S. typhimurium | 15200 |
| Salmonella typosa (Typhoid fever) | 4100 |
| Salmonella paratyphi (Enteric fever) | 6100 |
| Sarcina lutea | 26400 |
| Serratia marcescens | 6160 |
| Shigella dysenteriae (Dysentery) | 4200 |
| Shingella flexneri (Dysentery) | 3400 |
| Spiriflum rubrum | 6160 |
| Staphylococcus albus | 5720 |
| Staphylococcus aureus | 6600 |
| Streptococcus hemolyticus | 5500 |
| Streptococcus lactis | 8800 |
| Streptococcus viridans | 3800 |
| Vibria cholerse (Cholera) | 6500 |
| MOLD SPORES | |
| Aspergillus flavus (yellowish green) | 99000 |
| Aspergillus glaucus (bluish green) | 88000 |
| Aspergillus niger (black) | 330000 |
| Mucor racemosus A (white grey) | 35200 |
| Mucor racemosus B (white grey) | 35200 |
| Oospora lactis (white) | 11000 |
| Penicillum digitatum (olive) | 88000 |
| Penicillum expensum (olive) | 22000 |
| Penicillum roqueforti (green) | 26400 |
| Rhisopus nigricans (black) | 220000 |
| PROTOZOA | |
| Chlorella vulgaris (algae) | 22000 |
| Nematode eggs | 92000 |
| Paramecium | 200000 |
| VIRUS | |
| Bacterophage (E coli) | 6600 |
| Influenza | 6600 |
| Poliovirus (poliomyelitis) | 6000 |
| Virus of Infectious Hepatitis | 8000 |
| Tobacco mosaic | 440000 |
| YEAST | |
| Baker's yeast | 8800 |
| Brewer's yeast | 6600 |
| Common yeast cake | 13200 |
| Saccharomyces ellipsoideus | 13200 |
| Saccharomyces sp | 17600 |

This is not intended as a complete listing of all those organisms typically found on poultry carcasses, or as a complete listing of all those organisms against which the apparatus and method of the present invention are effective, but is presented for purposes of illustration.

The carcasses 20 are next conveyed through a region 26 wherein they are exposed to an ozone-enriched atmosphere. This step introduces the ozone into contact with organisms which may not have been exposed to sufficient ozone in the ozonated water spray region 22 and may not have been exposed to sufficient uv radiation (see the Table) in the uv exposure region 24 to achieve the desired level of biolysis.

After ozonation in region 26, some ozone will remain on the carcasses, and the desired level of biolysis may not yet have been achieved. To accomplish further biolysis and to break down any ozone remaining on the carcasses 20, the carcasses 20 are next passed through a region 28 where they are exposed to uv radiation in a wavelength range and for a time known to be effective, both for biolytic purposes and for ozone decomposition purposes. The use of uv at 253.7 nm for biolytic purposes was previously mentioned in this regard. It happens that uv in this same wavelength range will bring about the decomposition of ozone in effective amounts.

The poultry carcasses 20 are next conveyed to a region 30 where they are air chilled. As is known, this process involves chilling the poultry carcasses 20 to substantially refrigerator temperature by directing refrigerated air onto the surfaces of the carcasses 20. As a final cautionary step, the illustrated process includes exposing the air chilled carcasses 20 one more time to uv radiation, in a wavelength range and for a time known to be effective for biolytic purposes, in region 32 to guard against the possibility of the carcasses 20 having been inoculated with organisms in the chilled air to which they were exposed during the air chilling step in region 30.

Figure 2:
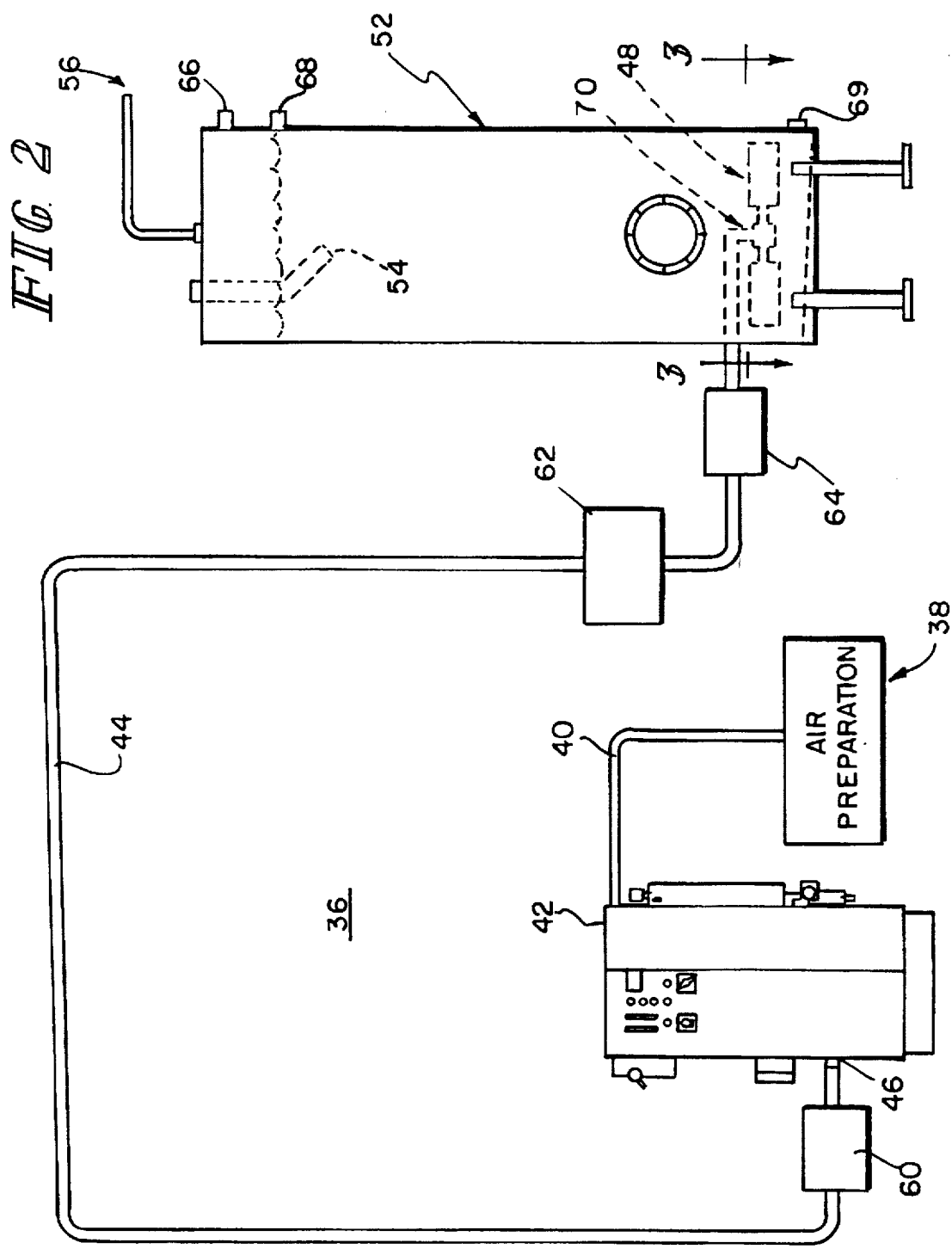
FIG. 2 illustrates a longitudinal sectional side elevational view of a detail of an apparatus useful for conducting a portion of the process illustrated in block diagram form in FIG. 1.
Figure 3:
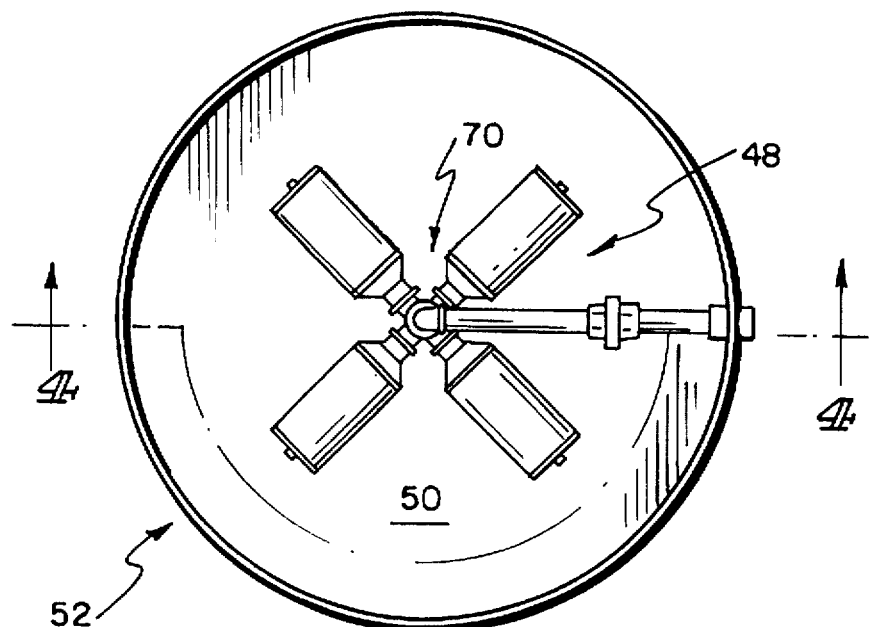
FIG. 3 illustrates a sectional view taken generally along section lines 3—3 of FIG. 2.
Figure 4:
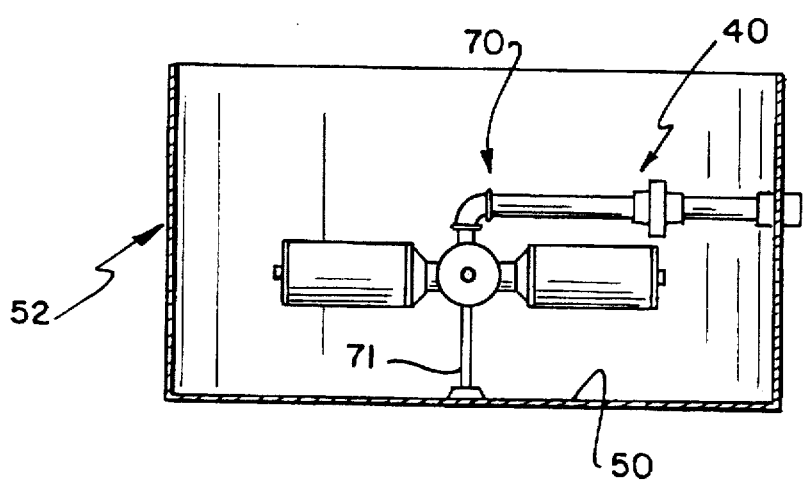
FIG. 4 illustrates a sectional view taken generally along section lines 4—4 of FIG. 3.

Turning now to FIGS. 2–4, a water ozonation system 36 for region 22 will be described. The system 36 includes an air preparation unit 38 which includes appropriate filtration devices and so on, a conduit 40 for transporting the prepared air to an ozone generator 42, and a conduit 44 for transporting ozone from an ozone outlet 46 of ozone generator 42 to a ceramic diffuser 48 spaced a short distance from the bottom 50 of a water ozonating tank 52.

A water inlet 54 and an ozone vent 56 are provided at the top of the tank 52. Undissolved ozone is transported away from the ozone vent 56 for treatment, reintroduction into conduit 44, or use elsewhere in the system. Appropriate check valves 60, 62 and a ball valve 64 are provided in conduit 44. Conduit 44 is above the water level in tank 52 a sufficient amount to prevent backflow of water from tank 52 into the ozone generator 42 should valves 60, 62, 64 malfunction. Optical level controls 66, 68 are incorporated into the sidewall of tank 52 to control the flow of water into the tank for ozonation. The illustrated diffuser 48 includes four sintered, or otherwise appropriately fabricated, ceramic mufflers or the like which release bubbles of ozone provided through a common manifold 70 into the water in tank 52. The manifold is mounted above the floor of tank 52 on a supporting leg 71. As the ozone bubbles upward through the water in tank 52, the ozone dissolves in the water. This ozonated water, supplied from outlet 69, is sprayed onto the carcasses at station 22.

Turning now to FIGS. 5–8, regions 24, 26 and 28 are realized in a stainless steel tunnel 80 having an entry end bulkhead 82, a bulkhead 84 which separates region 24 from region 26, a bulkhead 88 which separates region 26 from region 28, and an exit end bulkhead 90. The cross-sectional configurations of each of regions 24, 26 and 28 of tunnel 80 can best be appreciated by referring to FIGS. 6, 7 and 8, respectively. The carcasses 20 enter the tunnel 80, and region 24, hanging from a conveyor 94 through an opening 95 provided for that purpose in bulkhead 82. The walls of the tunnel 80 in each of regions 26 and 28 are lined with uv lamp tubes 92 which extend lengthwise of the tunnel 80. Lamps 92 are characterized by uv wavelengths in ranges effective to kill whatever organisms populate the carcasses 20 as the carcasses 20 are conveyed through regions 24, 28 on overhead conveyor 94. The wavelengths of the uv emitted by lamps 92 are also effective to decompose ozone back into diatomic oxygen, for a reason which will appear subsequently. Conveyor 94 illustratively can include a chain trained about drive and driven sprockets journalled for rotation beyond the upstream and downstream ends of tunnel 80.

The carcasses 20 next pass into region 26 of tunnel 80 through an opening 97 provided for that purpose in bulkhead 84. As can best be appreciated by referring to FIG. 7, tunnel 80 is divided in region 26 by an interior wall 96 into an upper plenum 98 and a lower plenum 100. Upper plenum 98 is supplied with ambient air by a blower 102. Plenum 98 is lined with uv lamp tubes 104. Lamps 104 extend lengthwise of tunnel 80. Lamps 104 are characterized by uv wavelengths in ranges effective to generate ozone from the approximately 21% oxygen contained in the ambient air pumped into upper plenum 98 by blower 102. Ozone will be generated, for example, by exposure of this oxygen to uv having wavelengths in the 185 nm range. The ozone diffuses downward through the slot 106 in wall 96 through which the carcasses 20 are supported from conveyor 94 for transport through tunnel 80. The ozone cascades down around and permeates the carcasses 20, killing organisms remaining after the uv exposure in region 24.

Finally, the ozonated carcasses 20 pass through an opening 108 provided for that purpose in bulkhead 88 and into region 28 where the uv from lamps 92 located in region 28 causes ozone remaining on the exposed surfaces of carcasses 20 to decompose back into diatomic oxygen prior to the exit of carcasses from the tunnel 80 through an opening 110 provided for that purpose in exit end bulkhead 90.

The lengths of the various regions 24, 26, 28 of tunnel 80 can be determined from an understanding of what results are desired to be achieved in each region, and like considerations. For example if a single lamp 92 produces 88 $\mu W/cm^2$ of energy density on a poultry carcass 20 in region 24 or 28, the speed of the conveyor 94, the number of lamps 92 in region 24 or 28, and the number of $\mu W\text{-sec}/cm^2$ of energy from the Table necessary to achieve a suitable organism population reduction can be considered, and the length of the region 24 or 28 determined. In region 26, the ozone-producing efficiency per $\mu W$ of energy produced by lamps 104, the desired concentration of ozone in plenum 100, and the time of exposure to that ozone concentration necessary to achieve a suitable organism population reduction, can be used to determine the length of region 26 necessary to achieve the desired organism population reduction here.

The following examples demonstrate the principles of biolysis employed in the present invention.

EXAMPLE 1

A chicken carcass is halved. One half is rinsed with boiled water. The aerobic plate count of the boiled water is taken and found to be about 200,000/ml. The other half is rinsed in ozonated water. The aerobic plate count of the ozonated water rinse is taken and found to be about 10/ml. This example establishes the efficacy of the ozonated water rinse conducted in region 22.

EXAMPLE 2

A chicken carcass is halved. One half is rinsed in boiled water. The aerobic plate count of the water is taken and found to be about 200,000/ml. The other half is then exposed to a stream of ozone on its interior and exterior surfaces, then to uv radiation, and is then rinsed in boiled water. The aerobic plate count of the water rinse is taken and found to be <10/ml. This example establishes the efficacy of the ozone/uv treatment conducted in regions 24, 26, 28.

What is claimed is:

1. A method of treating a foodstuff contaminated with organisms to reduce the population of organisms in preparation for consumption, the method comprising the step of exposing the foodstuff to a gaseous atmosphere containing a disinfectant gas, the step of exposing the foodstuff to a gaseous atmosphere containing disinfectant gas comprising the step of generating the disinfectant gas substantially in situ at the site where the foodstuff is to be exposed to the gaseous atmosphere containing the disinfectant gas, the disinfectant gas capable of being treated to cause it to decompose into non-hazardous by-products substantially immediately upon treatment of the disinfectant gas, and, substantially immediately after exposure of the foodstuff to the atmosphere containing the disinfectant gas, treating the foodstuff to convert disinfectant gas remaining thereon into non-hazardous by-products.

2. The method of claim 1 further comprising the step of treating the foodstuff with a disinfectant gas in water.

3. The method of claim 2 wherein the step of treating the foodstuff with a disinfectant gas in water comprises the step of treating the foodstuff with a disinfectant gas in water which disinfectant gas decomposes into non-hazardous by-products substantially immediately after exposure of the foodstuff to the disinfectant gas in water.

4. The method of claim 2 wherein the step of treating the foodstuff with a disinfectant gas in water comprises the step of treating the foodstuff with ozone dissolved in water.

5. The method of claim 1 wherein the step of exposing the foodstuff to a gaseous atmosphere containing a disinfectant gas comprises the step of treating the foodstuff with ozone.

6. The method of claim 5 wherein the step of generating the disinfectant gas substantially in situ at the site where the foodstuff is to be exposed to the gaseous atmosphere containing the disinfectant gas comprises the step of generating the ozone substantially in situ.

7. The method of claim 6 wherein the step of generating ozone substantially in situ comprises the step of exposing oxygen to electromagnetic radiation having a wavelength and energy density capable of generating sufficient ozone from the oxygen to effect disinfection.

8. The method of claim 7 wherein the step of exposing oxygen to electromagnetic radiation having a wavelength and energy density capable of generating sufficient ozone from the oxygen to effect disinfection comprises the step of exposing air to ultraviolet radiation (UV) having a wavelength and energy density capable of generating sufficient ozone from the oxygen to effect disinfection.

9. The method of claim 8 wherein the step of exposing air to uv having a wavelength and energy density capable of generating sufficient ozone from the oxygen to effect disinfection comprises the step of exposing air to uv having a wavelength in a range including about 185 nanometers (nm).

10. The method of claim 1 wherein the step of exposing foodstuff to a gaseous atmosphere containing a disinfectant gas comprises the step of exposing the foodstuff to a gaseous atmosphere containing ozone, and the step of treating the disinfectant gas to cause it to decompose into non-hazardous by-products comprises the step of, after exposing the foodstuff to a gaseous atmosphere containing ozone, exposing the foodstuff to electromagnetic radiation having a wavelength and energy density capable of converting the ozone back into diatomic oxygen.

11. The method of claim 10 wherein the step of generating the disinfectant gas substantially in situ at the site where the foodstuff is to be exposed to the gaseous atmosphere containing disinfectant gas comprises generating the ozone substantially in situ.

12. The method of claim 11 wherein the step of generating ozone substantially in situ comprises the step of exposing oxygen to electromagnetic radiation having a wavelength and an energy density capable of generating sufficient ozone from the oxygen to effect disinfection.

13. The method of claim 12 wherein the step of exposing oxygen to electromagnetic radiation having a wavelength and energy density capable of generating sufficient ozone from the oxygen to effect disinfection comprises the step of exposing air to uv radiation having a wavelength and energy density capable of generating sufficient ozone from the oxygen to effect disinfection.

14. The method of claim 13 wherein the step of exposing air to uv radiation having a wavelength and energy density capable of generating sufficient ozone from the oxygen to effect disinfection comprises the step of exposing ambient air to uv having a wavelength in a range including about 185 nm.

15. The method of claim 14 including the step of exposing the foodstuff to electromagnetic radiation having wavelength and energy density capable of converting the ozone back into diatomic oxygen after treatment of the foodstuff by the ozone.

16. The method of claim 15 wherein the step of exposing the foodstuff to electromagnetic radiation having a wavelength and energy density capable of converting the ozone back into diatomic oxygen after treatment of the foodstuff by the ozone comprises exposing the foodstuff to uv radiation having wavelengths in a range including 253.7 nm.

17. The method of claim 1 wherein the step of treating the foodstuff to convert disinfectant gas remaining thereon into non-hazardous by-products comprises the step of substantially simultaneously treating the disinfectant gas and the foodstuff to convert the disinfectant gas into non-hazardous by-products.

18. The method of claim 1, 2, 3, 4, 5, 6, 7, 8, 9, 10, 11, 12, 13, 14, 15, 16 or 17 wherein the step of exposing a foodstuff to a gaseous atmosphere containing a disinfectant gas comprises the step of exposing a poultry carcass to a gaseous atmosphere containing a disinfectant gas.

\* \* \* \* \*